United States Patent
Kudo et al.

(10) Patent No.: US 10,805,958 B2
(45) Date of Patent: Oct. 13, 2020

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Riichi Kudo, Yokosuka (JP); Hirantha Sithira Abeysekera, Yokosuka (JP); Munehiro Matsui, Yokosuka (JP); Takeo Ichikawa, Yokosuka (JP); Yasushi Takatori, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 40 days.

(21) Appl. No.: 15/747,899

(22) PCT Filed: Aug. 15, 2016

(86) PCT No.: PCT/JP2016/073838
§ 371 (c)(1),
(2) Date: Jan. 26, 2018

(87) PCT Pub. No.: WO2017/033789
PCT Pub. Date: Mar. 2, 2017

(65) Prior Publication Data
US 2018/0242366 A1   Aug. 23, 2018

(30) Foreign Application Priority Data
Aug. 21, 2015  (JP) .................................. 2015-164098

(51) Int. Cl.
*H04W 74/08* (2009.01)
*H04W 72/12* (2009.01)
(Continued)

(52) U.S. Cl.
CPC ..... *H04W 74/0833* (2013.01); *H04L 47/6215* (2013.01); *H04W 28/14* (2013.01);
(Continued)

(58) Field of Classification Search
None
See application file for complete search history.

(56) References Cited

U.S. PATENT DOCUMENTS

| 2007/0161364 A1 | 7/2007 | Surineni et al. |
| 2008/0002615 A1* | 1/2008 | Nakajima ............ H04L 1/1614 370/328 |

(Continued)

FOREIGN PATENT DOCUMENTS

| EP | 3264805 A1 | 1/2018 |
| JP | 2006-50244 A | 2/2006 |

(Continued)

OTHER PUBLICATIONS

International Preliminary Report on Patentability for PCT/JP2016/073838, (Ch. I) with English translation, IB, Geneva, issued Feb. 27, 2018, incorporating the English translation of the Written Opinion of the ISA, ISA/JP, dated Oct. 25, 2016.

(Continued)

*Primary Examiner* — Jeffrey M Rutkowski
*Assistant Examiner* — Chae S Lee
(74) *Attorney, Agent, or Firm* — Harness, Dickey & Pierce, P.L.C.

(57) ABSTRACT

Provided is a wireless communication system which performs downlink data transmission based on a transmission opportunity acquired by a wireless access point (hereinafter referred to as TXOP access) or a transmission opportunity acquired by a wireless station and granted to the wireless access point (hereinafter referred to as RXOP access), when performing the downlink data transmission from the wire- (Continued)

(1) Pre-control (P=1)

(2) Post-control less access point to the wireless station based on a random access scheme, in which the wireless access point includes a control unit performing, on a transmission buffer which sequentially stores data frames to be transmitted for each of wireless stations, processing which lowers an order of priority of the data frames which are to be destined for the wireless station A by the TXOP access at the transmission buffer according to a transmission status of the data frames destined for a wireless station A by the RXOP access.

9 Claims, 6 Drawing Sheets

(51) Int. Cl.
| | |
|---|---|
| H04W 74/00 | (2009.01) |
| H04W 84/12 | (2009.01) |
| H04W 28/14 | (2009.01) |
| H04L 12/863 | (2013.01) |
| H04W 72/10 | (2009.01) |
| H04W 88/08 | (2009.01) |

(52) U.S. Cl.
CPC ........... *H04W 72/10* (2013.01); *H04W 72/12* (2013.01); *H04W 74/00* (2013.01); *H04W 84/12* (2013.01); *H04W 88/08* (2013.01)

(56) References Cited

U.S. PATENT DOCUMENTS

| | | | | |
|---|---|---|---|---|
| 2009/0138603 | A1 | 5/2009 | Surineni et al. | |
| 2014/0086227 | A1 | 3/2014 | Yang et al. | |
| 2014/0112131 | A1* | 4/2014 | Todaka | G06F 13/4022 370/230 |
| 2014/0341228 | A1* | 11/2014 | Yamada | H04L 69/28 370/412 |
| 2016/0353485 | A1* | 12/2016 | Wentink | H04W 74/04 |
| 2017/0215083 | A1 | 7/2017 | Kudo et al. | |

FOREIGN PATENT DOCUMENTS

| | | |
|---|---|---|
| JP | 2013-034070 A | 2/2013 |
| WO | WO-2012064502 A1 | 5/2012 |
| WO | 2016/027855 A1 | 2/2016 |

OTHER PUBLICATIONS

Japanese Office Action in related application JP 2017-536758, "Notification of Reasons for Refusal", dated Nov. 9, 2018, with English translation attached.
Joon Yoo, "Receiver Centric Physical Carrier Sensing for Vehicular Ad Hoc Networks", 2013 International Conference on Information Science and Applications (ICISA), IEE, Jun. 24, 2013.
Extended European Search Report regarding EPSN 168391365, dated Feb. 15, 2019.
Part 11: Wireless LAN Medium Access Control (MAC) and Physical Layer (PHY) Specifications; IEEE Std 802.11acTM.
On the primacy of licensed spectrum in relation to the proposal of using LTE for a licensed-assisted access to unlicensed spectrum; 3GPP TSG-RAN #63.
Riichi Kudo et al., "Performance evaluation of unlicensed band access for future radio access mobile optical network", IEICE Technical Report, Nov. 5, 2014 (Nov. 5, 2014), vol. 114, No. 295, pp. 61 to 66 with full English translation.
Riichi Kudo et al., Channel Access Acquisition Mechanism Coupled with Cellular Network for Unlicensed Spectrum, Vehicular Technology Conference (VTC Spring), 2015 IEEE 81st, Jul. 2, 2015, [retrieved on Oct. 11, 2016]. Retrieved from the Internet: <URL:http://ieeexplore.ieee.org/stamp/stamp.jsp?amumber=7145734>.
MediaTek Inc., LBT design for Licensed Assisted Access [online], 3GPP TSG-RAN WG1 Meeting #82 R1-154650, Aug. 15, 2015, [retrieved on Oct. 11, 2016], Retrieved from the Internet: <URL:http://www.3gpp.org/ftp/tsg_ran/WG1_RL1/TSGR1_82/Docs/R1-154650.zip>.
International Search Report (Japanese and English) and Written Opinion of the ISA (Japanese) for PCT/JP2016/073838, ISA/JP, Tokyo, dated Oct. 25, 2016.
Korean Office Action regarding KRSN 1020187004873, dated Jun. 19, 2019.
Indian Office Action from counterpart IN201817002247, dated Feb. 27, 2020.

* cited by examiner

FIG. 1

(1) Pre-control (P=1)

(2) Post-control

FIG. 2

(1) Pre-control (P=1)

(2) Post-control

FIG. 3

(1) Pre-control (P=1)

(2) Post-control

FIG. 4

(1) Pre-control ($\rho = 0.5$)

(2) Post-control

FIG. 5

(1) Pre-control (P=1)

(2) Post-control

FIG. 6

(1) Pre-control (P=1)

(2) Post-control

FIG. 7

(1) Pre-control (P=1)

(2) Post-control

FIG. 8

(1) Pre-control ($\rho=0.5$)

(2) Post-control

PRIOR ART

FIG. 9

PRIOR ART

FIG. 10

PRIOR ART

F I G. 1 1

WIRELESS COMMUNICATION SYSTEM AND WIRELESS COMMUNICATION METHOD

CROSS REFERENCE TO RELATED APPLICATION

This application is a U.S. National Stage application claiming the benefit of prior filed International Application Number PCT/JP2016/073838, filed on Aug. 15, 2016, in which the International Application claims priority from Japanese Patent Application Number 201-164098, filed on Aug. 21, 2015, the entire contents of which are incorporated herein by reference.

TECHNICAL FIELD

The present invention relates to transmission control that is performed when downlink data transmission from a wireless access point (AP) to a wireless station (STA is short for station) is performed in a wireless communication system and a wireless communication method that perform communication based on a random access scheme, such as Carrier Sense Multiple Access/Collision Avoidance (CSMA/CA).

The present invention relates particularly to schedule control of a transmission buffer that is performed when an AP performs transmission, based on a transmission opportunity that is acquired by the AP or a transmission opportunity that is acquired by a STA and is granted to the AP.

BACKGROUND ART

Wireless Local Area Network (LAN) systems that comply with a standard IEEE 802.11 have been improved in throughput year after year, and have come into widespread use as one example of main wireless access (Non-Patent Document 1). Because the wireless LAN system can be used in an unlicensed band that is a frequency band which does not require a license, various types of wireless stations have come into widespread use. Particularly, the spread of smartphones remarkably increases an opportunity to use the wireless LAN system.

A 2.4 GHz band, a 5 GHz band, and a 60 GHz band are granted as unlicensed bands that are frequency bands which are used by the wireless LAN system. In microbands, a 2.4 GHz band and a 5 GHz band, a band that can be used by the wireless LAN system in Japan is approximately 500 MHz. Furthermore, a band that is equal to or greater than 500 MHz is granted as a band that is possibly used abroad by the wireless LAN system. On the other hand, because wireless communication in an unlicensed band is performed based on a random access scheme such as CSMA/CA, a hidden terminal problem is a great obstacle. Flow control that uses Request-To-Send (RTS) and Clear-To-Send (CTS) is proposed for the purpose of solving the hidden terminal problem.

Figure 9:
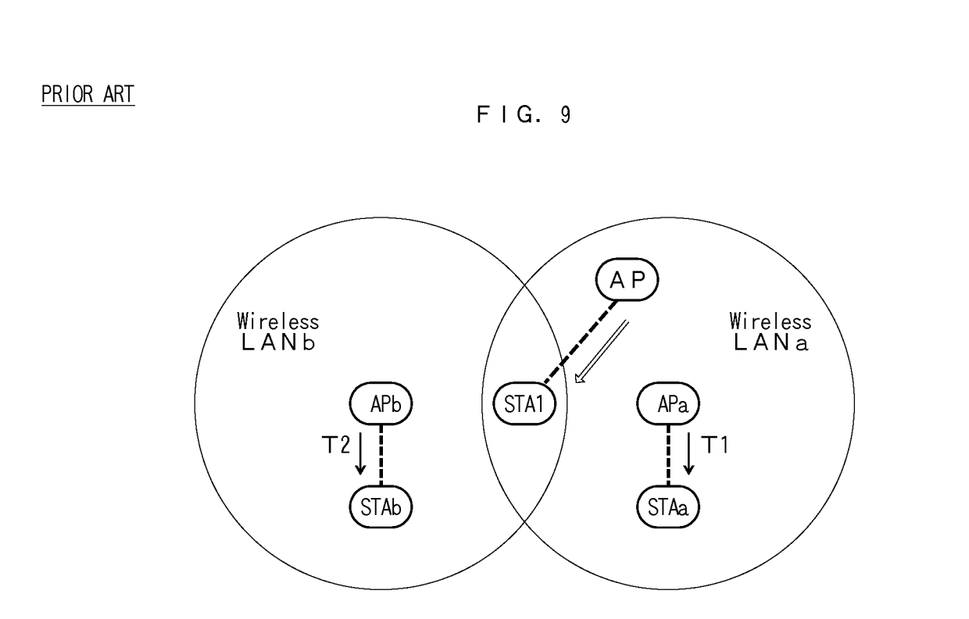
FIG. 9 is a diagram illustrating an example 1 of downlink data transmission of a wireless communication system.

At this point, as illustrated in FIG. 9, two wireless LANs, a wireless LAN a and a wireless LAN b are present in an area where the AP that is a transmission node which uses the unlicensed band and a STA 1 that is a reception node communicate with each other. The AP is present in a position where wireless signals of an AP a and a STA a on one wireless LAN, a wireless LAN a can be detected. The STA 1 is present in a position where the wireless signals of the AP a and the STA a on one wireless LAN, the wireless LAN a, and wireless signals of an AP b and a STA b of the other wireless LAN, a wireless LAN b can be detected. That is, the AP cannot detect the wireless signals of the AP b and the STA b on the wireless LAN b, and the wireless LAN b is in a hidden-terminal relation.

Before the AP transmits user data to the STA 1, the AP transmits an RTS frame, and the STA 1 transmits a CTS frame. At this time, a wireless access point AP a and a wireless station STA a on the wireless LAN a set a Network Allocation Vector (NAV) according to the RTS frame or the CTS frame. Furthermore, a wireless access point AP b and a wireless station STA b on the wireless LAN b set the NAV according to the CTS frame that is transmitted by the STA 1. Accordingly, the wireless LAN a stops the communication, and along with this, the wireless LAN b that is a hidden terminal from the perspective of the AP can stop the communication as well, and can perform communication with the STA 1 over a wireless channel. An opportunity for transmission with random access over the wireless channel is acquired by the AP.

In this manner, when it comes to exchange of the RTS frame and the CTS frame, if the wireless signal over the wireless LAN b, which cannot be detected from the AP, is present, the STA 1 transmits the CTS frame according to the RTS frame from the AP and set the NAV. Thus, it is possible that the hidden terminal problem is solved and that a decrease in throughput is prevented.

Incidentally, in 3GPP, a standardization organization, the discussion on a cellular system that uses an unlicensed band for a wireless LAN has begun (Non-Patent Document 2), and attention has been focused on a method of utilizing the unlicensed band. That is, in the cellular system, the utilization of a frequency band (the unlicensed band) for the wireless LAN in compliance with specifications for the unlicensed band has been discussed as well. The description as the wireless LAN is provided here, but any communication system in which communication is performed with the random access in the unlicensed band may be available.

For example, in a situation that is illustrated in FIG. 9, if a data frame from the AP to the STA 1 is transmitted, an environment where wireless resources are insufficient for the wireless signal of the terminal in the wireless LAN b that is the hidden terminal from the AP, that is, an environment where the wireless signal is always transmitted, is considered. In this case, the RTS frame that is transmitted from the AP experiences a collision, and thus is not received in the STA 1, or due to the NAV that is set by the wireless LAN b, the STA 1 cannot transmit the CTS frame in response to the RTS frame that is transmitted from the AP. As a result, a problem occurs in that although control which is based on the RTS and CTS is performed, throughput decreases. To cope with this problem, when the STA 1 does not detect the wireless signals of the wireless LAN a and the wireless LAN b, the NAV is set for each and thus the transmission opportunity is acquired. Then, the STA 1 assigns the acquired transmission opportunity to the AP, and transmits the data frame using the transmission opportunity that is granted by the AP. Thus, an influence of the hidden terminal in the AP is reduced and throughput of downlink from the AP to the STA 1 can be improved (Non-Patent Document 3).

Non-Patent Document 1: IEEE Std 802.11ac(TM)-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, December 2013

Non-Patent Document 2: RP-140057, "On the primacy of licensed spectrum in relation to the proposal of using LTE for a licensed-assisted access to unlicensed spectrum", 3GPP TSG-RAN #63, March 2014

Non-Patent Document 3: R. Kudo, B. A. H. S. Abeysekera, Y. Takatori, T. Ichikawa, M. Mizoguchi, H. Yasuda, A. Yamada, Y. Okumura, "Channel access acquisition mechanism coupled with cellular network for unlicensed spectrum", in Proc., VTC2015-Spring, May 2015

DISCLOSURE

Problems to be Solved

Figure 10:
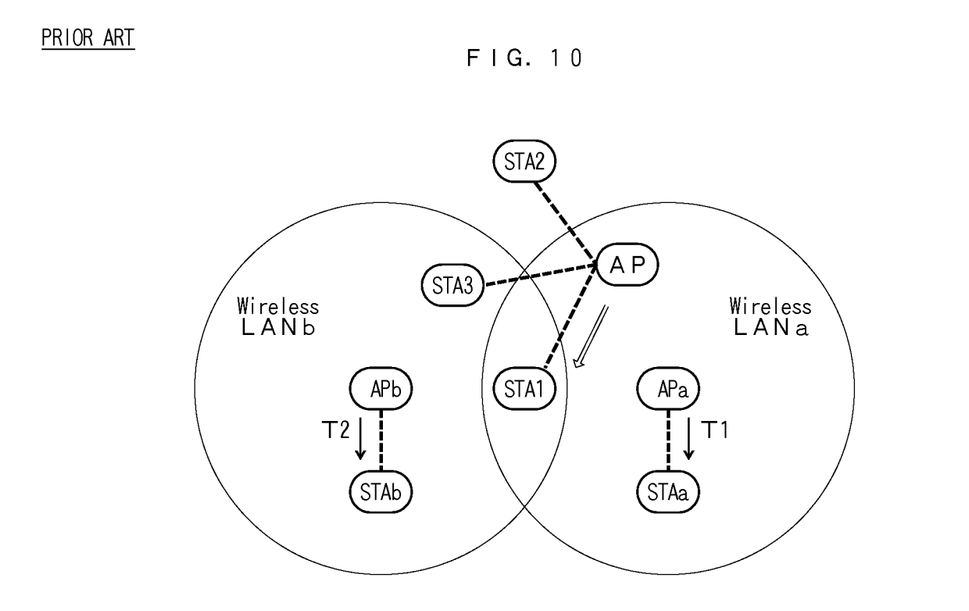
FIG. 10 is a diagram illustrating an example 2 of the downlink data transmission of the wireless communication system.

However, if a plurality of STAs are present, scheduling of user data that is transmitted from an AP is more complicated. FIG. 10 illustrates a situation in which the AP performs downlink data transmission with three STAs, a STA 1 to a STA 3.

A relationship between the AP and the STA 1 is as illustrated in FIG. 9. The AP can detect communication with a wireless LAN a, and the STA 1 can detect communication with the wireless LAN a and a wireless LAN b. For this reason, in the downlink data transmission from the AP to STA 1, the AP, with a scheme (hereinafter referred to as "TXOP access") in which the AP acquires a transmission opportunity, throughput decreases due to a communication situation of the wireless LAN b that has a relationship with a hidden terminal. On the other hand, with a scheme (hereinafter referred to as "RXOP access") in which the transmission opportunity that is acquired when the STA 1 cannot detect wireless signals of the wireless LAN a and the wireless LAN b is granted to the AP, an improvement in throughput is expected.

The STA 2 is positioned at a place where the communication with the wireless LAN a and the communication with the wireless LAN b cannot be both detected. If the AP performs TXOP access to the STA 2, this does not cause the throughput to decrease, because the wireless LAN b is not in a hidden-terminal relation. On the other hand, if the AP performs the RXOP access to the STA 2, the throughput decreases due to a communication situation of the wireless LAN a, because the wireless LAN a is in the hidden-terminal relationship from the standpoint of the STA 2.

The STA 3 can detect the communication with the wireless LAN b, but is positioned at a place where the communication with the wireless LAN a cannot be detected. If the AP performs the TXOP access to the STA 3, as is the case with the STA 1, the throughput decreases due to the communication situation of the wireless LAN b that is in the hidden-terminal relation. On the other hand, if the AP performs the RXOP access to the STA 3, unlike the case with the STA 1, because the wireless LAN a is in the hidden-terminal relation from the standpoint of the STA 3, the improvement in throughput cannot be expected due to the communication situation of the wireless LAN a.

In this manner, in the downlink data transmission from the AP to the STA, according to a position of the STA, in some cases, as is the case with the STA 2, satisfactory throughput can be expected with the TXOP access, and in other cases, as is the case with the STA 1, satisfactory throughput can be expected with the RXOP access.

Figure 11:
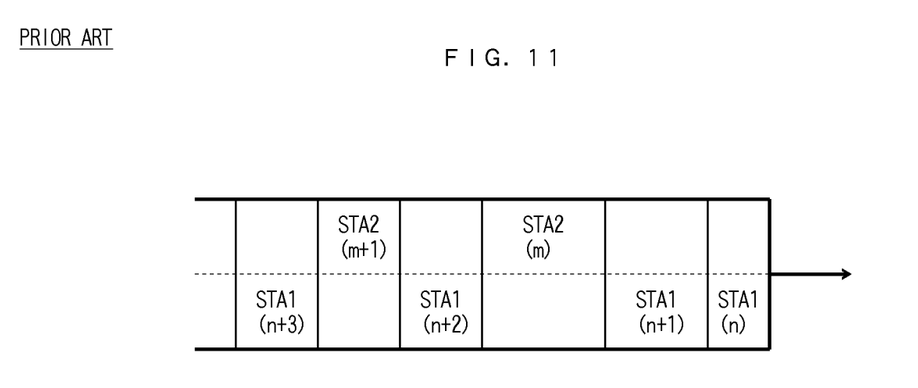
FIG. 11 is a diagram illustrating a state of a transmission buffer of an AP in the related art.

FIG. 11 illustrates a state of a transmission buffer of the AP in the related art.

In FIG. 11, a transmission schedule in the transmission buffer of the AP is basically performed based on a fixed policy, such as a First-In, First-Out (FIFO). The AP retains a data frame that is destined for the STA 1 and the STA 2. With regard to the order of transmitting the data frame that is destined for the STA 1 and the STA 2, a data frame with Sequence No. n, which is destined for the STA 1 is first transmitted, followed by a data frame with Sequence No. n+1, which is destined for the STA 1, followed by a data frame with Sequence No. m, which is destined for the STA 2, a data frame with Sequence No. n+2, which is destined for the STA 1, a data frame with Sequence No. m+1, which is destined for the STA 2, a data frame with Sequence No. n+3, which is destined for the STA 1. In FIG. 11, the data frame with Sequence No. n, which is destined for the STA 1, is expressed as STA 1(n), and other data frames are expressed in this manner.

At this point, if the AP performs the TXOP access to the STA 1 and the STA 2, throughput for the STA 1 decreases, but throughput for the STA 2 is improved. On the other hand, if the AP performs the RXOP access to the STA 1 and the STA 2, the throughput for the STA 1 is improved, but the throughput for the STA 2 decreases. In this manner, if the AP interchangeably performs the TXOP access and the RXOP access, the unfairness in throughput occurs among users. Furthermore, a failure in the transmission of the data frame that is destined for one or several of the STAs occurs repeatedly, and system throughput decreases.

A proposition of the present invention is to provide a wireless communication system and a wireless communication method that perform schedule control of transmission buffer in such a manner that remarkable unfairness in throughput does not occur among users in a wireless communication system that performs TXOP access and RXOP access.

Means for Solving the Problems

According to a first invention, there is provided a wireless communication system which performs downlink data transmission based on a transmission opportunity acquired by a wireless access point (hereinafter referred to as TXOP access) or a transmission opportunity acquired by a wireless station and granted to the wireless access point (hereinafter referred to as RXOP access), when performing the downlink data transmission from the wireless access point to the wireless station based on a random access scheme, in which the wireless access point includes a control unit performing, on a transmission buffer which sequentially stores data frames to be transmitted for each of wireless stations, processing which lowers an order of priority of the data frames which are to be destined for the wireless station A by the TXOP access at the transmission buffer according to a transmission status of the data frames destined for a wireless station A by the RXOP access.

In the wireless communication system according to the first invention, the control unit is configured to sequentially shift backward P (P is a positive integer) data frames from head which are to be destined for the wireless station A, and to perform the processing lowering the order of priority of the data frames which are to be destined for the wireless station A at the transmission buffer.

In the wireless communication system according to the first invention, the control unit is configured to sequentially shift forward P (P is a positive integer) data frames from head which are to be destined for the wireless stations besides the wireless station A, and to perform the processing lowering the order of priority of the data frames which are to be destined for the wireless station A at the transmission buffer.

In the wireless communication system according to the first invention, the control unit is configured to shift P (P is a positive integer) data frames from head which are to be destined for the wireless stations besides the wireless station A to head of the transmission buffer, and to perform the processing lowering the order of priority of the data frames which are to be destined for the wireless station A at the transmission buffer.

In the wireless communication system according to the first invention, the control unit is configured to shift backward a shift position of the data frames which are to be destined for the wireless station A while thinning the shift position at a fixed rate ρ, and to perform the processing lowering the order of priority of the data frames which are to be destined for the wireless station A at the transmission buffer.

In the wireless communication system according to the first invention, the control unit is configured to perform the processing lowering the order of priority of the data frames which are to be destined for the wireless station A at the transmission buffer after being triggered by a transmission success of the data frames destined for the wireless station by the RXOP access.

In the wireless communication system according to the first invention, the control unit is configured to perform the processing lowering the order of priority of the data frames which are to be destined for the wireless station A at the transmission buffer after being triggered when a time length exceeded a predetermined value, the time length is a length of time successively present at a head of the transmission buffer the data frames which are to be destined for the wireless station A by the RXOP access.

In the wireless communication system according to the first invention, the control unit is configured to perform the processing lowering the order of priority of the data frames which are to be destined for the wireless station A at the transmission buffer after being triggered when the number of data frames or a bit number of data frames which are to be destined for the wireless station A by the RXOP access exceeded a predetermined value.

According to a second invention, there is provided a wireless communication method which performs downlink data transmission based on a transmission opportunity acquired by a wireless access point (hereinafter referred to as TXOP access) or a transmission opportunity acquired by a wireless station and granted to the wireless access point (hereinafter referred to as RXOP access), when performing the downlink data transmission from the wireless access point to the wireless station based on a random access scheme, in which the wireless access point performs, on a transmission buffer which sequentially stores data frames to be transmitted for each of wireless stations, processing which lowers an order of priority of the data frames which are to be destined for the wireless station A by the TXOP access at transmission buffer according to a transmission status of the data frames destined for a wireless station A by the RXOP access.

Effects

According to the present invention, processing that lowers priorities of data frames at transmission buffer with TXOP access, which are destined for a wireless station A, in terms of order of priority, and raises priorities of data frames at transmission buffer with the TXOP access, which are destined for a wireless station other than the wireless station A, in terms of order of priority is performed according to a transmission status of the data frame which is destined for the wireless station A, with RXOP access. Thus, the unfairness in throughput among wireless stations that perform the TXOP access and the RXOP access can be eliminated.

DETAILED DESCRIPTION OF THE EMBODIMENTS

Schedule Control Example 1 of a Transmission Buffer of an AP

Figure 1:
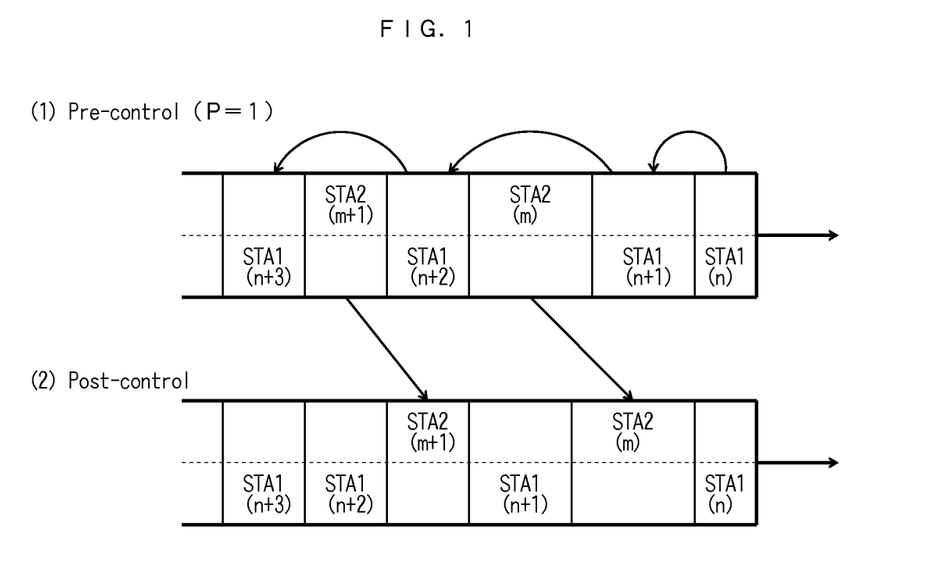
FIG. 1 is a diagram illustrating a schedule control example 1 of a transmission buffer of an AP.

FIG. 1 illustrates a schedule control example 1 of a transmission buffer of an AP according to the present invention. (1) of FIG. 1 illustrates pre-control, and (2) of FIG. 1 illustrates post-control.

In FIG. 1, data frames are stored in the transmission buffer of the AP in the following order: a data frame STA 1($n$) with Sequence No. n, which is destined for an STA 1, a data frame STA 1($n$+1) with Sequence No. n+1, which is destined for the STA 1, a data frame STA 2($m$) with Sequence No. m, which is destined for an STA 2, a data frame STA 2($n$+2) with Sequence No. n+2, which is destined for the STA 1, a data frame STA 2($m$+1) with Sequence No. m+1, which is destined for the STA 2, a data frame STA 1($n$+3) with Sequence No. n+3, which is destined for the STA 1. The AP acquires a transmission opportunity with TXOP access and RXOP access, and along with this, transmits data frames one by one starting from a head data frame.

The schedule control of the transmission buffer according to the present invention has the feature of performing the following processing. Priorities of data frames at transmission buffer with the TXOP access, which are destined for the STA are lowered in terms of order of priority, according to a transmission status of the data frame, which is destined for the STA, with the RXOP access. At this point, an example will be described in which the priority of the data frame that is destined for the STA 1, which depends on the TXOP access, is lowered in terms of order of priority and in which a priority of the data frame that is destined for the STA 2 is raised.

P data frames are sequentially shifted backward starting from a head data frame that is destined for the STA 1, of which a priority is lowered. At this point, an example where P=1 is illustrated. STA 1(*n*) is substituted into a position of STA 1(*n*+1), STA 1(*n*+1) is substituted into a position of STA 1(*n*+2), STA 1(*n*+2) is substituted into a position of STA 1(*n*+3), and STA 1(*n*+3) is positioned at the end.

Accordingly, the priorities of the data frames at the transmission buffer, which are destined for the STA 1 can be lowered in terms of order of priority, and the data frame that is destined for the STA 2 can be preferentially transmitted with the TXOP access.

Schedule Control Example 2 of the Transmission Buffer of the AP

Figure 2:
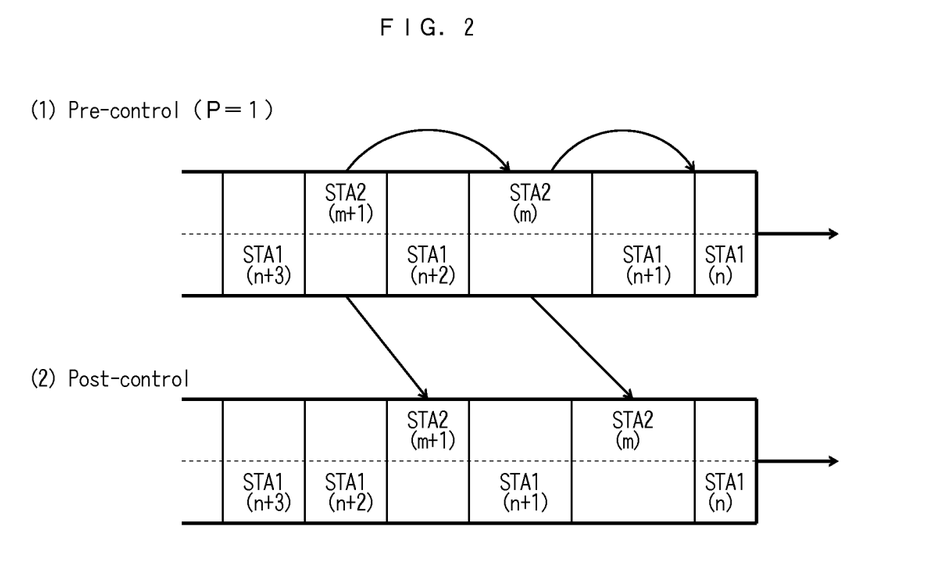
FIG. 2 is a diagram illustrating a schedule control example 2 of the transmission buffer of the AP.

FIG. 2 illustrates a schedule control example 2 of the transmission buffer of the AP according to the present invention. (1) of FIG. 2 illustrates pre-control, and (2) of FIG. 2 illustrates post-control.

The present embodiment has the following feature. In a situation in (1) of FIG. 2 that is the same as that (1) of FIG. 1, with regard to data frames that are destined for the STA 2 other than the STA 1, for which the throughput is improved with the RXOP access, P data frames are shifted forward starting from a head data frame. At this point, the example where P=1 is illustrated. STA 2(*m*) is shifted to a position before STA 1(*n*+1), and STA 2(*m*+1) is shifted to a position of STA 2(*m*).

Accordingly, the priorities of the data frames at the transmission buffer, which are destined for the STA 1 can be lowered in terms of order of priority, and the data frame that is destined for the STA 2 can be preferentially transmitted with the TXOP access.

Schedule Control Example 3 of the Transmission Buffer of the AP

Figure 3:
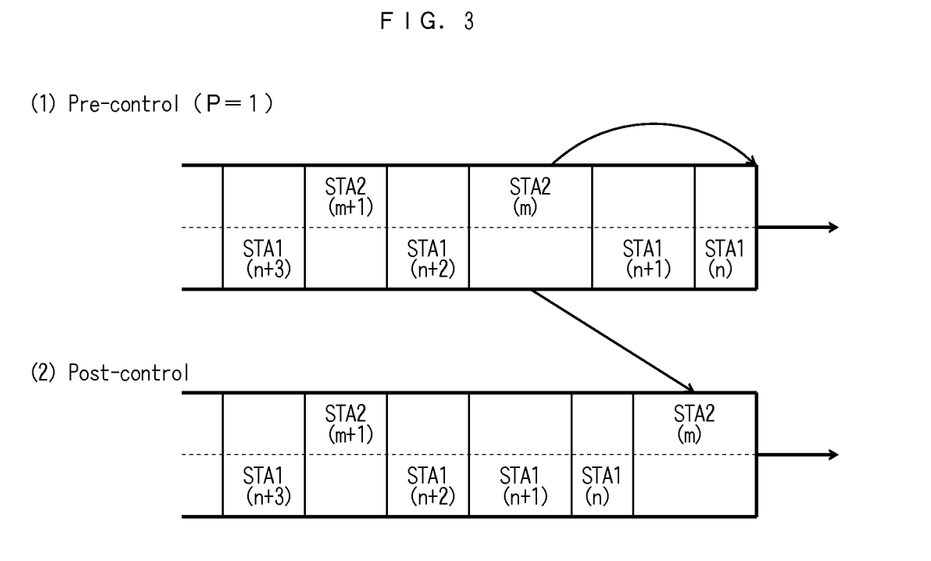
FIG. 3 is a diagram illustrating a schedule control example 3 of the transmission buffer of the AP.

FIG. 3 illustrates a schedule control example 3 of the transmission buffer of the AP according to the present invention. (1) of FIG. 3 illustrates pre-control, and (2) of FIG. 3 illustrates post-control.

The present embodiment has the following feature. In a situation in (1) of FIG. 3 that is the same as that (1) of FIG. 1, with regard to the data frames that are destined for the STA 2 other than the STA 1, for which the throughput is improved with the RXOP access, P data frames are shifted to the head of the transmission buffer, starting from a head data frame. At this point, the example where P=1 is illustrated. STA 2(*m*) is the head, and STA 1(*n*) and STA 1(*n*+1) are moved back after STA 2(*m*). Accordingly, the priorities of the data frames at the transmission buffer, which are destined for the STA 1 can be lowered in terms of order of priority, and the data frame that is destined for the STA 2 can be preferentially transmitted with the TXOP access.

Schedule Control Example 4 of the Transmission Buffer of the AP

Figure 4:
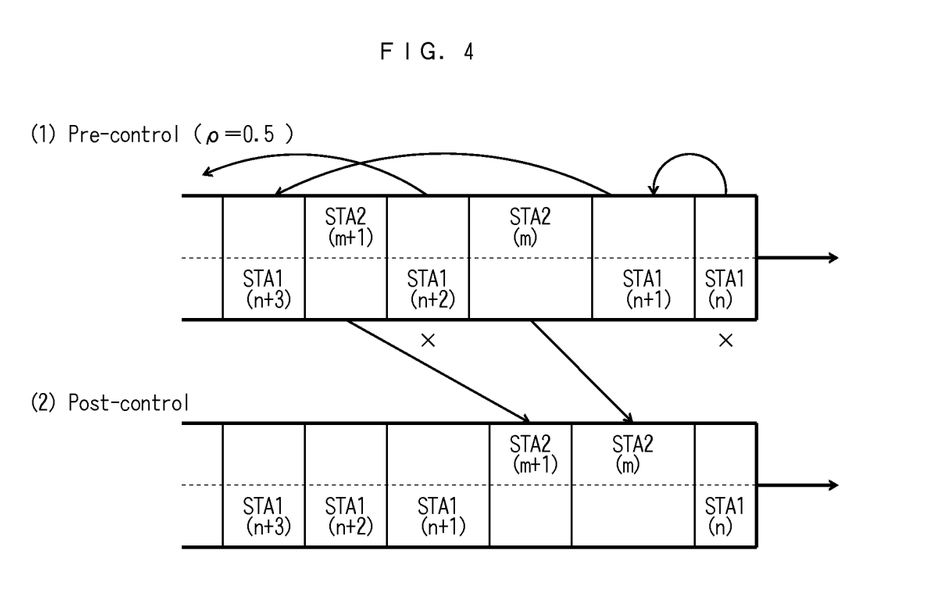
FIG. 4 is a diagram illustrating a schedule control example 4 of the transmission buffer of the AP.

FIG. 4 illustrates a schedule control example 4 of the transmission buffer of the AP according to the present invention. (1) of FIG. 4 illustrates pre-control, and (2) of FIG. 4 illustrates post-control.

The present embodiment has the following feature. In a situation in (1) of FIG. 4 that is the same as that (1) of FIG. 1, with regard to data frames that are destined for the STA 2 other than the STA 1 of which the throughput is improved with the RXOP access, backward shifting is performed while a shift position is thinned at a fixed rate of p. At this point, an example where p=0.5 is illustrated. Shift positions of STA 1(*n*) and STA 1(*n*+2) are targets for thinning. STA 1(*n*) is shifted to a position of STA 1(*n*+1), STA 1(*n*+1) is shifted to a position of STA 1(*n*+3), and STA 1(*n*+2) is shifted after STA 1(*n*+3).

Accordingly, the priorities of the data frames at the transmission buffer, which are destined for the STA 1 can be lowered in terms of order of priority, and the data frame that is destined for the STA 2 can be preferentially transmitted with the TXOP access.

In the control examples 1 to 4 described above, for the STA 1 of which the throughput is improved with the RXOP access, a priority for the transmission with the TXOP access is lowered in terms of order of priority. Thus, throughput of one other STA 2 of which throughput is not improved with the RXOP access can be improved.

Furthermore, the control examples 1 to 4 described above are performed after being triggered by the following the transmission status from the AP to the STA 1.

A case 1 is a trigger that is based on the starting or performing of the RXOP access to the STA 1. The AP performs the examples 1 to 4 after being triggered by a decision that the RXOP access to the STA 1 is performed, a notification that the RXOP access to the STA 1 is performed, and a notification from the STA 1 that the RXOP access starts. Alternatively, after being triggered by these, the control examples 1 to 4 may be performed at fixed time intervals.

A case 2 is a trigger that is based on a success in the transmission with RXOP access to the STA 1. The AP performs the control examples 1 to 4 if the following conditions are satisfied: a success in packet transmission with the RXOP access, a condition that a successful packet transmission rate for the RXOP access satisfies a fixed value, and a condition that the number of packets or the number of bits that are transmitted with the RXOP access satisfies a fixed value.

A case 3 is a trigger that is based on packets at transmission buffer with the TXOP access to the STA 1. The time for which a packet for the STA 1, of which a priority is set to be lowered in terms of order of priority of a packet at transmission buffer, is present at the head is set to be a parameter, and then the AP performs the control examples 1 to 4. For example, the AP performs the control examples 1 to 4, subject to the time for which the packet for the STA 1, of which the priority is set to be lowered in terms of order of priority, is present at the head, the number of times that an access opportunity is acquired while the packet of the STA 1 is present at the head, or the number of packets that are present successively at the head.

At this point, the case 1 and the case 3 can be described in the schedule control examples 1 to 4 of the transmission buffer, which are described above, but the case 2 is set to be triggered by the data frame for the STA being successfully transmitted with the RXOP access. A control example in the case 2 will be described below.

A schedule control example 1' to a schedule control example 4' in FIGS. 5 to 8 correspond to the schedule control example 1 to the schedule control example 4 in FIGS. 1 to 4, respectively.

Figure 5:
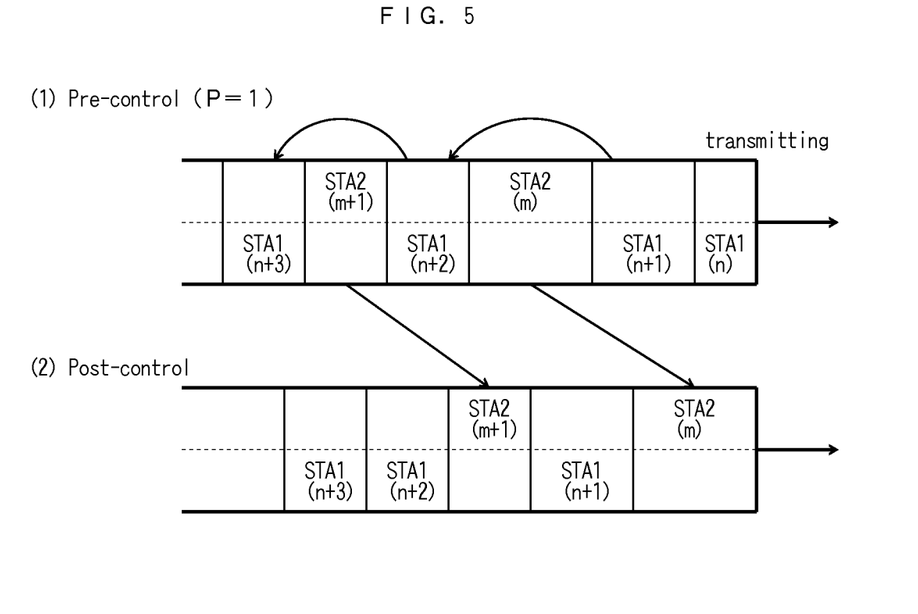
FIG. 5 is a diagram illustrating a schedule control example 1' of the transmission buffer of the AP.

In FIG. 5, triggering is set to be performed when, with the RXOP access, the data frame STA 1(*n*) with Sequence No. n, which is destined for the STA 1, is normally transmitted. In the schedule control example 1', P data frames are sequentially shifted backward starting from a head data frame that is destined for the STA 1. At this point, the example where P=1 is illustrated. STA 1(*n*+1) is substituted into the position of STA 1(*n*+2), STA 1(*n*+2) is substituted into the position of STA 1(n+3), and STA 1(n+3) is positioned at the end. As a result, the data frame STA 2(m) with Sequence No. m, which is destined for the STA 2, is at the head of the transmission buffer.

Figure 6:
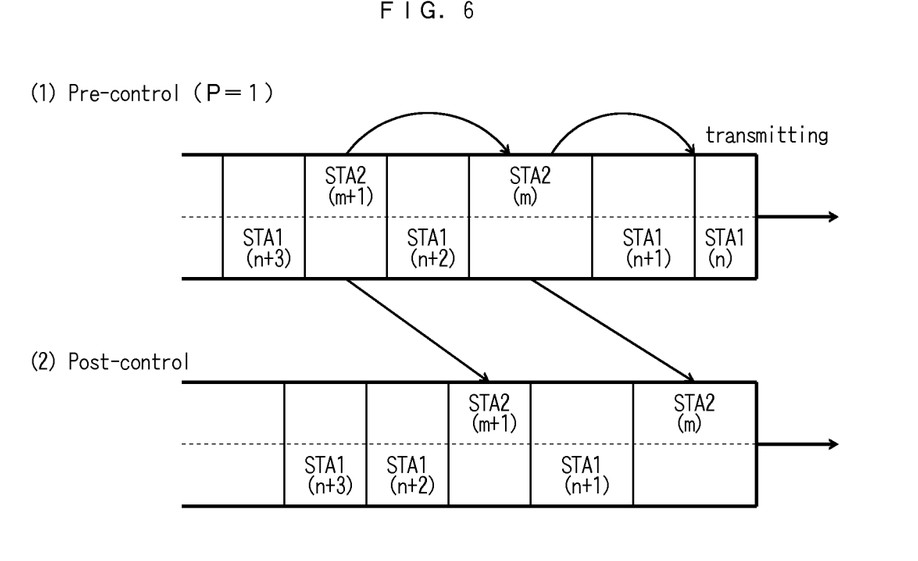
FIG. 6 is a diagram illustrating a schedule control example 2' of the transmission buffer of the AP.

In FIG. 6, triggering is set to be performed when, with the RXOP access, the data fame STA 1(n) with Sequence No. n, which is destined for the STA 1, is normally transmitted. In the schedule control example 2', P data frames are sequentially shifted forward starting from a head data frame that is destined for the STA 2. At this point, the example where P=1 is illustrated. STA 2(m) is shifted to a position before STA 1(n+1), and STA 2(m+1) is shifted to a position of STA 2(m). As a result, the data frame STA 2(m) with Sequence No. m, which is destined for the STA 2, is at the head of the transmission buffer.

Figure 7:
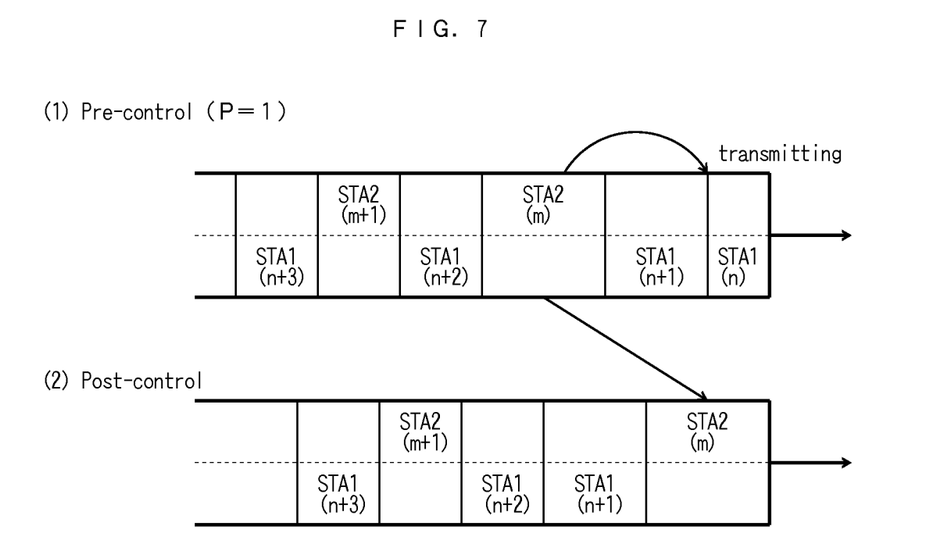
FIG. 7 is a diagram illustrating a schedule control example 3' of the transmission buffer of the AP.

In FIG. 7, triggering is set to be performed when, with the RXOP access, the data fame STA 1(n) with Sequence No. n, which is destined for the STA 1, is normally transmitted. In the schedule control example 3', P data frames are shifted to the head of the transmission buffer, starting from a head data frame that is destined for the STA 2. At this point, the example where P=1 is illustrated. STA 2(m) is the head, STA 1(n+1) is moved back after STA 2(m).

Figure 8:
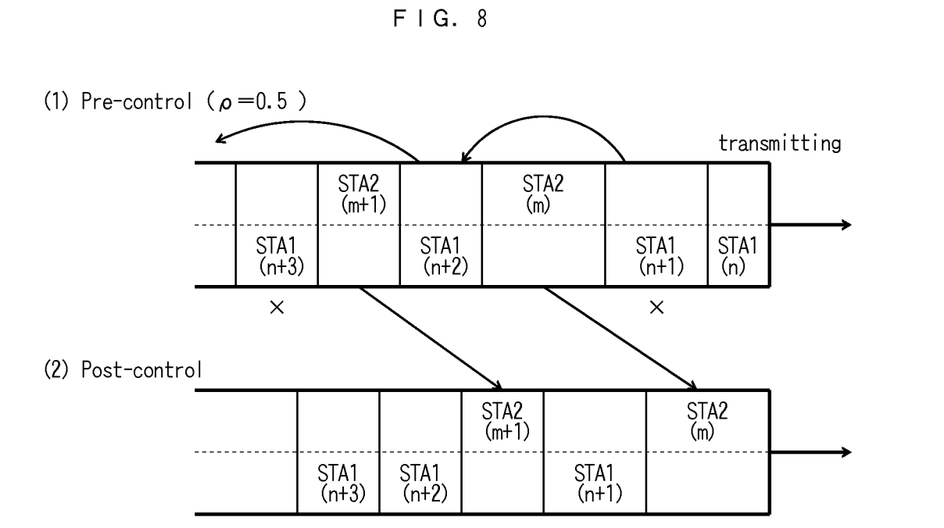
FIG. 8 is a diagram illustrating a schedule control example 4' of the transmission buffer of the AP.

In FIG. 8, triggering is set to be performed when, with the RXOP access, the data frame STA 1(n) with Sequence No. n, which is destined for the STA 1, is normally transmitted. In the sequence control example 4', backward shifting is performed while a shift position of the data frame that is destined for the STA 1 is thinned at a fixed rate of p. At this point, the example where p=0.5 is illustrated. Shift positions of STA 1(n+1) and STA 1(n+3) are targets for thinning. STA 1(n+1) is shifted to the position of STA 1(n+2), STA 1(n+2) is shifted to a position after STA 1(n+3), and STA 1(n+3) is shifted after the STA 1(n+2).

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling with the scope thereof.

The invention claimed is:

1. A wireless communication system which performs downlink data transmission based on one of a transmission opportunity acquired by a wireless access point (hereinafter referred to as TXOP access) or a transmission opportunity acquired by a wireless station and assigned to the wireless access point (hereinafter referred to as RXOP access), when performing the downlink data transmission from the wireless access point to the wireless station based on a random access scheme, wherein
the wireless access point includes a control unit performing, on a transmission buffer which sequentially stores data frames to be transmitted for each of wireless stations, processing which lowers an order of priority of the data frames which are to be destined for a wireless station A at the transmission buffer according to a transmission status of the data frames destined for the wireless station A by the RXOP access.

2. The wireless communication system according to claim 1, wherein the control unit is configured to sequentially shift backward P (P is a positive integer) data frames from head which are to be destined for the wireless station A, and to perform the processing lowering the order of priority of the data frames which are to be destined for the wireless station A at the transmission buffer.

3. The wireless communication system according to claim 1, wherein the control unit is configured to sequentially shift forward P (P is a positive integer) data frames from head which are to be destined for the wireless stations besides the wireless station A, and to perform the processing lowering the order of priority of the data frames which are to be destined for the wireless station A at the transmission buffer.

4. The wireless communication system according to claim 1, wherein the control unit is configured to shift P (P is a positive integer) data frames from head which are to be destined for the wireless stations besides the wireless station A to a head of the transmission buffer, and to perform the processing lowering the order of priority of the data frames which are to be destined for the wireless station A at the transmission buffer.

5. The wireless communication system according to claim 1, wherein the control unit is configured to shift backward a shift position of the data frames which are to be destined for the wireless station A while thinning the shift position at a fixed rate p, and to perform the processing lowering the order of priority of the data frames which are to be destined for the wireless station A at the transmission buffer.

6. The wireless communication system according to claim 1, wherein the control unit is configured to perform the processing lowering the order of priority of the data frames which are to be destined for the wireless station A at the transmission buffer after being triggered by a transmission success of the data frames destined for the wireless station A by the RXOP access.

7. The wireless communication system according to claim 1, wherein the control unit is configured to perform the processing lowering the order of priority of the data frames which are to be destined for the wireless station A at the transmission buffer after being triggered when a time length exceeded a predetermined value, the time length is a length of time successively present at a head of the transmission buffer the data frames which are to be destined for the wireless station A by the RXOP access.

8. The wireless communication system according to claim 1, wherein the control unit is configured to perform the processing lowering the order of priority of the data frames which are to be destined for the wireless station A at the transmission buffer after being triggered when one of the number of data frames and a bit number of data frames which are to be destined for the wireless station A by the RXOP access exceeded a predetermined value.

9. A wireless communication method which performs downlink data transmission based on one of a transmission opportunity acquired by a wireless access point (hereinafter referred to as TXOP access) or a transmission opportunity acquired by a wireless station and assigned to the wireless access point (hereinafter referred to as RXOP access), when performing the downlink data transmission from the wireless access point to the wireless station based on a random access scheme,
wherein the wireless access point includes a control unit performing, on a transmission buffer which sequentially stores data frames to be transmitted for each of wireless stations, processing which lowers an order of priority of the data frames which are to be destined for a wireless station A at the transmission buffer according to a transmission status of the data frames destined for the wireless station A by the RXOP access.

\* \* \* \* \*